E. H. SIEGLER.
INSECT TRAP.
APPLICATION FILED SEPT. 18, 1918.
1,293,563.
Patented Feb. 4, 1919.
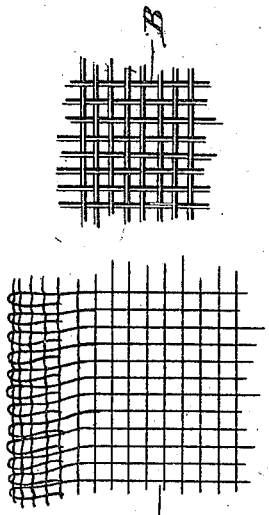
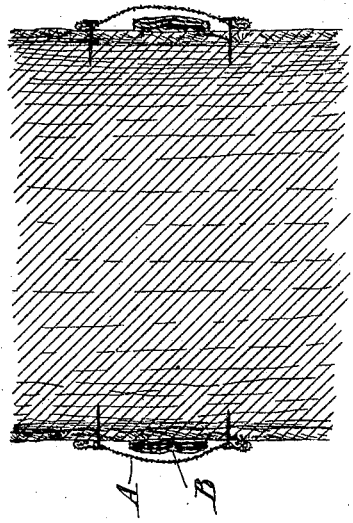
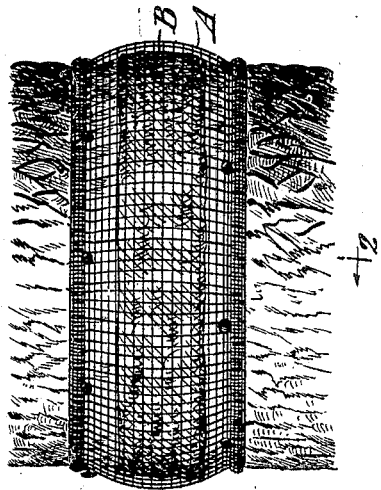
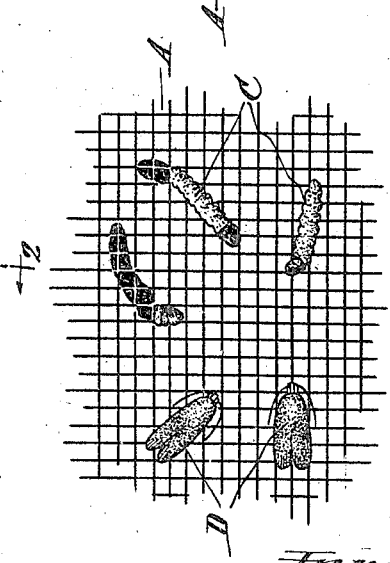
Inventor:
E. Horace Siegler,
By
Attorney.

UNITED STATES PATENT OFFICE.

EDOUARD HORACE SIEGLER, OF WASHINGTON, DISTRICT OF COLUMBIA.

INSECT-TRAP.

1,293,563.  Specification of Letters Patent.  Patented Feb. 4, 1919.

Application filed September 18, 1918. Serial No. 254,629.

(FILED UNDER THE ACT OF MARCH 3, 1883, CHAPTER 143, 22 STAT. L., 625.)

*To all whom it may concern:*

Be it known that I, EDOUARD H. SIEGLER, a citizen of the United States of America, residing at Washington, District of Columbia, and an employee of the U. S. Department of Agriculture (whose post-office address is Department of Agriculture, Washington, D. C.,) have invented a new and useful Improvement in Insect-Traps, of which the following is a specification.

This application is made under the act of March 3, 1883, chapter 143 (22 Stat. 625), and the invention herein described and claimed may be used by the Government of the United States, or any of its officers or employees, in the prosecution of work for the Government, or any person in the United States, without payment to me of any royalty thereon.

My invention consists of a strip of wire screen, japanned or galvanized iron, or copper, placed over a strip of cloth, such as burlap or any substance affording a suitable cocooning place for insects. The screen and cloth bands encircle the trunk of a tree; the edges of the screen are held in close contact with the trunk by any convenient means, as by tacks and sealing material or in any way to prevent the passage of the adult insects beneath the edges. The trap is designed to take advantage of the biological truth that certain insects, in their larval or immature stage, can and will pass through a smaller opening than that through which the adults can escape. The mesh of the wire screen, its width, the kind and width of the cloth band and certain details of construction and application will vary according to the insect for which the trap is intended.

In the accompanying drawing, Figure 1 is a view of the trap as it appears when properly attached to a tree trunk; Fig. 2 shows a vertical section on the line 2—2; Fig. 3 illustrates a section of the wire screen, showing worms passing through and moths of the same species too large to escape through the mesh; Fig. 4 represents a section of the wire screen with the edge folded and crimped; and Fig. 5 is a piece of burlap cloth which is employed for the band. A is the wire screen; B, the cloth band; C, worm or larva; D, adult or moth.

For use in capturing the codling moth, which is herein used as an example, the following specifications have been found by experimentation, to be satisfactory. The wire screen, 12 meshes to the inch, is cut into strips 6 inches wide, the edges are folded over twice, allowing ¼ inch to each fold, after which the total width of the screen will be 5 inches. The edges are then crimped or corrugated by any convenient method to provide for the expansion of the tree trunk and to form a bulge extending beyond the cloth band for a distance of not less than ½ inch; if the edges are not frizzed, the wire screen can be held at the proper distance above the cloth by means of a few tacks, the heads of which project above the cloth band. The latter should be reasonably heavy and preferably of dark colored material, 2 inches in width and should be equidistant from the edges of the wire screen.

The codling moth larva or worm, upon completing its feeding within the fruit, wanders up and down the trunk in search of a place to cocoon, and, upon meeting with the trap, enters through one of the openings in the screen and spins its cocoon beneath the cloth band. Later the moth emerges and its escape is prevented by the wire screen and is thus automatically trapped.

Having thus described my invention, I claim:

An insect trap comprising a tree-trunk-encircling band of textile fabric and a cover therefor consisting of a member extending above and below the fabric band and fitted closely around the tree trunk, said cover member having elsewhere than at its margins natural passages through which insects in their larval or immature stage may pass, but which will not permit the escape of adult insects.

In testimony whereof I affix my signature in the presence of two subscribing witnesses.

E. HORACE SIEGLER.

Witnesses:
 BENNET A. PORTER,
 R. E. SNODGRASS.

Copies of this patent may be obtained for five cents each, by addressing the "Commissioner of Patents, Washington, D. C."